United States Patent
Weber et al.

(10) Patent No.: US 10,328,605 B2
(45) Date of Patent: Jun. 25, 2019

(54) CERAMIC COMPONENT CASTING

(71) Applicant: Apple Inc., Cupertino, CA (US)

(72) Inventors: Douglas Weber, Arcadia, CA (US); Naoto Matsuyuki, Aichi (JP)

(73) Assignee: APPLE INC., Cupertino, CA (US)

( * ) Notice: Subject to any disclaimer, the term of this patent is extended or adjusted under 35 U.S.C. 154(b) by 752 days.

(21) Appl. No.: 14/172,375

(22) Filed: Feb. 4, 2014

(65) Prior Publication Data
US 2015/0217479 A1    Aug. 6, 2015

(51) Int. Cl.
| B28B 13/02 | (2006.01) |
| B28B 17/02 | (2006.01) |
| B28B 7/36 | (2006.01) |
| B28B 7/44 | (2006.01) |
| B28B 1/08 | (2006.01) |

(Continued)

(52) U.S. Cl.
CPC .......... B28B 17/026 (2013.01); B28B 1/082 (2013.01); B28B 1/24 (2013.01); B28B 7/36 (2013.01); B28B 7/44 (2013.01); B28B 13/02 (2013.01); B28B 13/0275 (2013.01); C04B 35/486 (2013.01); C04B 2235/6027 (2013.01)

(58) Field of Classification Search
None
See application file for complete search history.

(56) References Cited

U.S. PATENT DOCUMENTS

| 3,293,002 A | 12/1966 | Werner |
| 4,095,647 A | 6/1978 | Asselman et al. |
| 4,248,645 A | 2/1981 | Jewett |

(Continued)

FOREIGN PATENT DOCUMENTS

| DE | 4200185 | 7/1992 |
| EP | 0289128 | 11/1988 |

(Continued)

OTHER PUBLICATIONS

U.S. Appl. No. 13/623,645, filed Sep. 20, 2012, Christopher D. Prest.

(Continued)

*Primary Examiner* — Jacob T Minskey
(74) *Attorney, Agent, or Firm* — Dorsey & Whitney LLP

(57) ABSTRACT

Methods for improved ceramics component casting. One such method may include vacuuming a ceramic-based slurry mixture and/or vacuuming a component mold. The vacuuming of the ceramic-based slurry mixture and the component mold may be to remove air bubbles from the respective elements. More specifically, the vacuuming may remove air bubbles from the ceramic-based slurry mixture and from a cavity of the component mold, respectively. The method may also include disposing the ceramic-based slurry mixture into the cavity of the component mold, and continuously vacuuming the cavity of the component mold including the ceramic-based slurry mixture for a predetermined time to remove any additional air bubbles included in the ceramic-based slurry mixture. Finally, the method may include forming a ceramic component within the continuously vacuumed cavity of the component mold over the duration of the predetermined time. The ceramic component formed from the ceramic-based slurry mixture.

17 Claims, 10 Drawing Sheets

(51) Int. Cl.
   *B28B 1/24*   (2006.01)
   *C04B 35/486*   (2006.01)

(56) References Cited

U.S. PATENT DOCUMENTS

| | | | |
|---|---|---|---|
| 4,303,465 A | | 12/1981 | Bagdasarov et al. |
| 4,335,081 A | | 6/1982 | Sachs |
| 4,349,367 A | | 9/1982 | Krumweide |
| 4,681,718 A | | 7/1987 | Oldham |
| 5,035,593 A | | 7/1991 | Huang et al. |
| 5,049,064 A | | 9/1991 | Wills |
| 5,576,750 A | * | 11/1996 | Brandon .............. B41J 2/17513 347/87 |
| 5,820,649 A | | 10/1998 | Ogure et al. |
| 6,066,279 A | | 5/2000 | Walls et al. |
| 6,152,211 A | | 11/2000 | Klug et al. |
| 6,280,662 B1 | * | 8/2001 | Beratan ................ B30B 11/001 257/E27.008 |
| 6,368,525 B1 | | 4/2002 | Klug et al. |
| 7,430,880 B2 | | 10/2008 | Butts et al. |
| 7,682,452 B2 | | 3/2010 | Outwater |
| 7,713,896 B2 | | 5/2010 | Henneck et al. |
| 7,993,476 B2 | | 8/2011 | Nakazono et al. |
| 8,201,615 B2 | | 6/2012 | Soukhojak et al. |
| 8,628,708 B2 | * | 1/2014 | Del-Gallo ............... C04B 28/18 264/122 |
| 8,652,658 B2 | | 2/2014 | Tatartchenko et al. |
| 8,980,115 B2 | | 3/2015 | Bibl et al. |
| 9,814,151 B2 | | 11/2017 | Probst |
| 2009/0099003 A1 | * | 4/2009 | Matsuoka .............. B28B 1/007 501/82 |
| 2009/0140982 A1 | | 6/2009 | Chen et al. |
| 2010/0001231 A1 | * | 1/2010 | Loukus ................. B22F 3/227 252/182.12 |
| 2011/0256377 A1 | | 10/2011 | Chiruvolu et al. |
| 2011/0302962 A1 | | 12/2011 | Gattermann et al. |
| 2013/0236699 A1 | | 9/2013 | Prest et al. |
| 2014/0080081 A1 | | 3/2014 | Prest et al. |
| 2014/0090592 A1 | | 4/2014 | Memering et al. |
| 2016/0270247 A1 | | 9/2016 | Jones et al. |

FOREIGN PATENT DOCUMENTS

| | | |
|---|---|---|
| EP | 0345022 | 12/1989 |
| JP | 53073481 | 6/1978 |
| JP | S57143624 | 9/1982 |
| JP | S59048805 | 3/1984 |
| JP | 59097593 | 6/1984 |
| JP | S59111128 | 6/1984 |
| JP | S61028507 | 2/1986 |
| JP | H01156006 | 6/1989 |
| JP | H01304902 | 12/1989 |
| JP | H04104933 | 4/1992 |
| JP | 10158088 | 6/1998 |
| JP | H11165309 | 6/1999 |
| JP | 2000280211 | 10/2000 |
| JP | 2002305316 | 10/2002 |
| JP | 2004039931 | 2/2004 |
| JP | 3601791 | 12/2004 |
| JP | 2007276293 | 10/2007 |
| JP | 2008501605 | 8/2008 |
| JP | 4245856 | 4/2009 |
| JP | 2010504274 | 2/2010 |
| JP | 2010540390 | 12/2010 |
| JP | 4618426 | 1/2011 |
| JP | 2011502099 | 1/2011 |
| JP | 2011504451 | 2/2011 |
| JP | 2014070016 | 4/2014 |
| TW | M438642 | 10/2012 |
| WO | WO2001/090028 | 11/2001 |
| WO | WO2005121034 | 12/2005 |
| WO | WO2008036888 | 3/2008 |
| WO | WO2009058293 | 5/2009 |
| WO | WO2009067641 | 5/2009 |

OTHER PUBLICATIONS

U.S. Appl. No. 13/631,602, filed Sep. 28, 2012, Dale N. Memering.
International Search Report and Written Opinion, PCT/US2015/013801, filed Jan. 30, 2015, dated May 8, 2015, 10 pages.

* cited by examiner

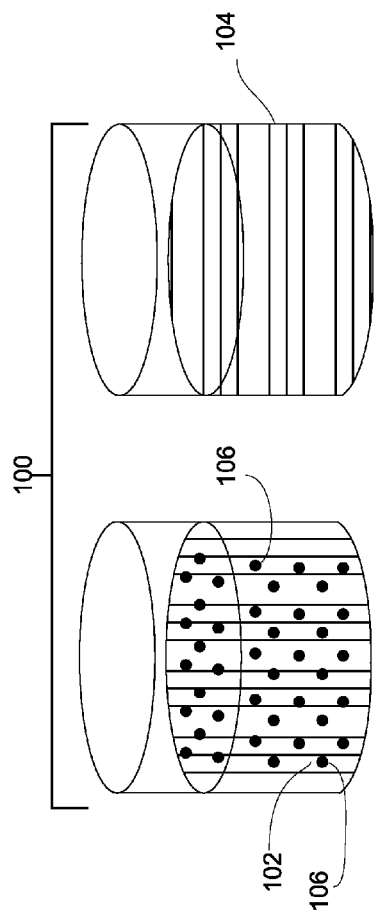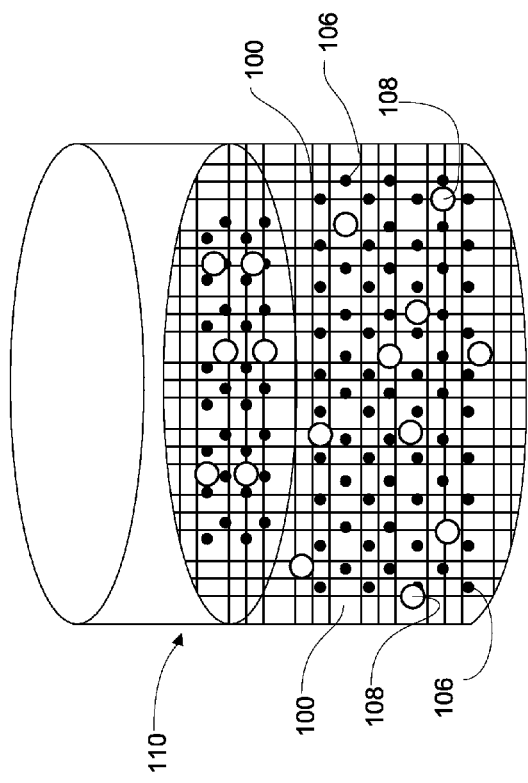

CERAMIC COMPONENT CASTING

TECHNICAL FIELD

The disclosure relates generally to manufacturing processes, and, more particularly, to methods of casting ceramic components.

BACKGROUND

Ceramic-based components can be used in a variety of products including structural/building materials, kitchen and tableware, automotive components, medical devices and electronic devices. These ceramic-based components may be used in such a variety of industries because of the desirable physical properties and characteristics. As one example, ceramic-based materials may include high strength properties (e.g., fracture toughness, ductility), include dielectric constant properties and may be substantially transparent, dependent on manufacture. Conventional ceramic-based components are typically made using two techniques: ceramic injection molding (CIM) and ceramic gel casting.

Conventional CIM processing typically involves the use of a mold and ceramic-based material that may be substantially liquid when heated. The ceramic-based material may be heated to a specific temperature to be completely liquefied, and then may be poured into the mold. The mold may then be mechanically pressed together using a high compression force, and rapidly cooled. The cooling of the mold, and liquid material within the mold, may cause the ceramic-based material to become substantially solid and take the shape of the mold.

The molds used in CIM can be very expensive, and very difficult to create. More specifically, at least partially due to the patterns that may be included in the mold and the required material composition that can withstand the rapid heating and cooling of CIM, the molds may be very expensive and may be difficult and time consuming to manufacture. Additionally, if a mold is defective, it typically cannot be corrected, and a new mold must be created. Furthermore, the rapid heating and cooling of the ceramic-based material used in the CIM process may ultimately have a negative effect on the physical properties of the ceramic component formed in the CIM process. For example, where the ceramic-based material is heated above a desired temperature during the CIM process, the final ceramic component formed using CIM may have a decreased ductility properties.

Ceramic gel casting is another conventional manufacturing process for creating ceramic components. In gel casting, a monomer is typically combined with a liquid mixture including a ceramic material, and the combination is disposed within a mold. Similar to CIM, once the liquid mixture and monomer are included in the mold, the mixture is heated to a predetermined temperature to polymerize the liquid and ultimately form a ceramic component. Also similar to CIM, the conventional gel casting process includes placing the mold under high pressure during the casting process and rapidly cooling the mixture to form the ceramic component.

Conventional gel casting may include additional complications. For example, conventional gel casting may cause air bubbles to be formed in the final ceramic component, which may substantially reduce the strength of the ceramic component and may cause undesirable cosmetic defects. Air bubbles may be present in the mixture prior to the pouring or otherwise placing the mixture into the mold, and/or air bubbles may be present within the mold during the casting process. Additionally, the ceramic material included in the mixture may not be evenly and/or completely combined with the monomer material during the gel casting process, which may result in a ceramic component having a varying density. That is, a portion of the ceramic component formed from the mixture having a high concentration of ceramic material may be substantially dense, where a portion of the ceramic component formed form the mixture having a low concentration of ceramic material may include minimal density.

SUMMARY

Generally, embodiments discussed herein are related to methods for improved ceramic component casting. The methods of casting may include combining two materials, where the combining of the two materials begin a curing process to form a ceramic component. At least one of the two materials may include zirconia particles. The combined materials, including the zirconia particles, may be disposed within a cavity of a ceramic component mold, and may cure over a predetermined time to form a ceramic component. The forming of the ceramic component may be accomplished by maintaining a minimal compression force and relatively constant temperature surrounding the two materials including the zirconia particles. That is, the formation may not require any additional pressure than the amount of pressure needed to hold the component mold together. Additionally, the formation may not require the addition of heat to the two materials including the zirconia to form the ceramic component. As a result, the mold need not withstand rapid heating and cooling, and may be made from a more cost-effective material. Additionally, through the casting process, the two materials including the zirconia and/or the mold may be subjected to a vacuum in order to remove air bubbles that may negatively affect the formed ceramic component.

One embodiment may include a method for improved ceramic casting. The method may include vacuuming at least one of: a ceramic-based slurry mixture to remove air bubbles from the ceramic-based slurry mixture, and a component mold to remove air bubbles from a cavity of the component mold. The method may also include disposing the ceramic-based slurry mixture into the cavity of the component mold, and forming a ceramic component within the cavity of the component mold over the duration of a predetermined time. The ceramic component may be formed from the ceramic-based slurry mixture.

A further embodiment may include an additional method for improved ceramic casting. The method may include vacuuming at least one of: a ceramic-based slurry mixture to remove air bubbles from the ceramic-based slurry mixture, and a component mold to remove air bubbles from a cavity of the component mold. The method may also include disposing the ceramic-based slurry mixture into the cavity of the component mold, and continuously vacuuming the cavity of the component mold including the ceramic-based slurry mixture for a predetermined time. Additionally, the method may include forming a ceramic component within the continuously vacuumed cavity of the component mold over the duration of the predetermined time. The ceramic component may be formed from the ceramic-based slurry mixture.

BRIEF DESCRIPTION OF THE DRAWINGS

The disclosure will be readily understood by the following detailed description in conjunction with the accompanying drawings, wherein like reference numerals designate like structural elements, and in which:

FIG. 1A shows an illustrative first material and a second material included in a ceramic-based slurry mixture, according to embodiments.

FIG. 1B shows an illustrative ceramic-based slurry mixture including the combined first material and second material of FIG. 1A, according to embodiments.

Figure 2:
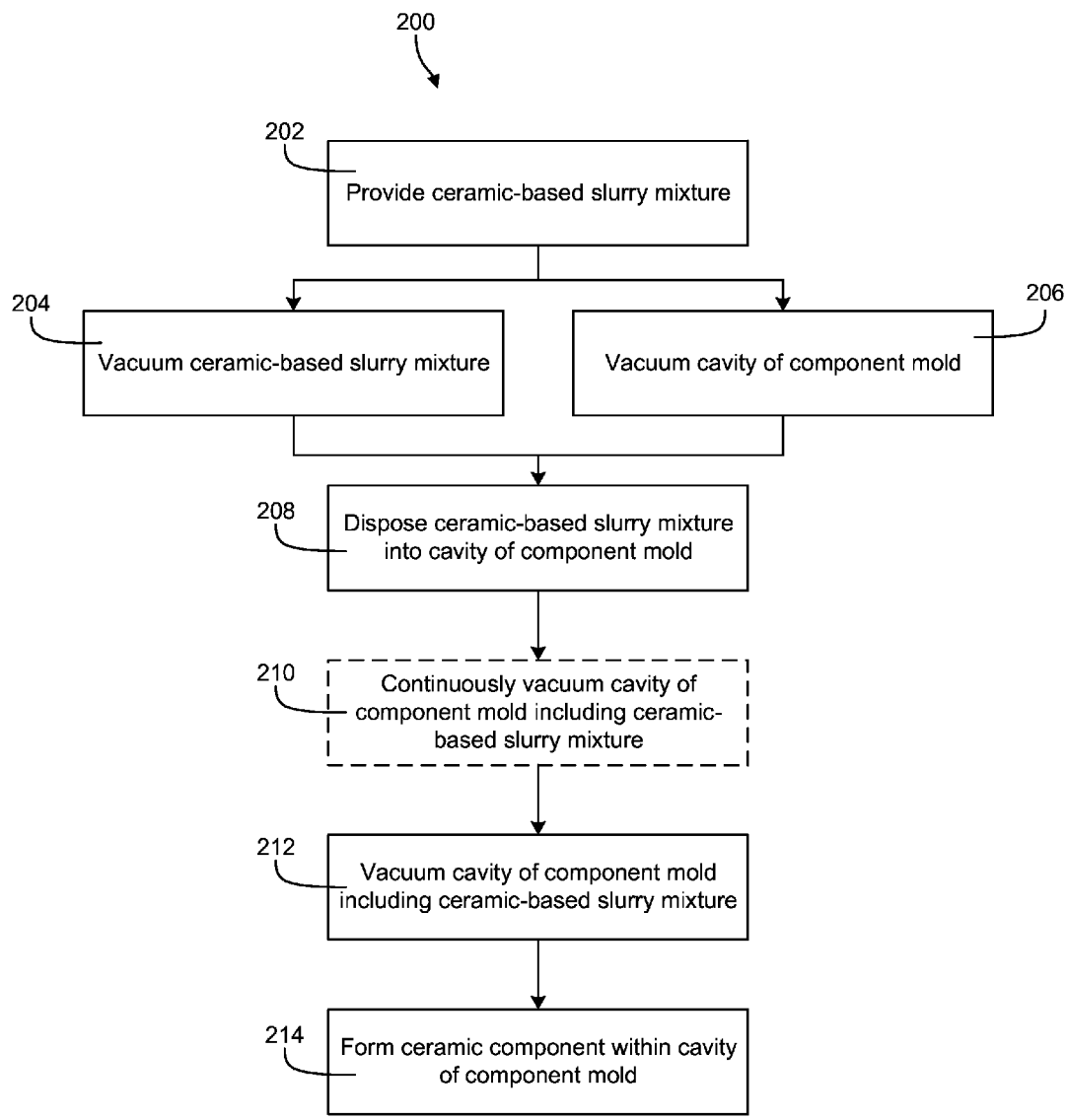
FIG. 2 is a flow chart illustrating a method for casting a ceramic component. This method may be performed using the ceramic-based slurry mixture as shown in FIG. 1B.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to manufacturing process, and more particularly, to improved methods of ceramic component casting.

In a particular embodiment a method of casting may include combining two materials, where the combining of the two materials begin a curing process to form a ceramic component. At least one of the two materials may include zirconia particles. The combined materials, including the zirconia particles, may be disposed within a cavity of a ceramic component mold, and may cure over a predetermined time to form a ceramic component. The forming of the ceramic component may be accomplished by maintaining a minimal compression force and relatively constant temperature surrounding the two materials including the zirconia. That is, the formation may not require any additional pressure than the amount of pressure needed to hold the component mold together. Additionally, the formation may not require the addition of heat to the two materials including the zirconia to form the ceramic component. As a result, the mold need not withstand rapid heating and cooling, and may be made from a more cost-effective material. Additionally, through the casting process, the two materials including the zirconia and/or the mold may be subjected to a vacuum in order to remove air bubbles that may negatively affect the formed ceramic component.

One sample, non-limiting method for improved ceramic casting may include vacuuming at least one of: a ceramic-based slurry mixture to remove air bubbles from the ceramic-based slurry mixture; and a component mold to remove air bubbles from a cavity of the component mold. The method may also include disposing the ceramic-based slurry mixture into the cavity of the component mold, and forming a ceramic component within the cavity of the component mold over the duration of a predetermined time. The ceramic component may be formed from the ceramic-based slurry mixture.

An alternative method for improved ceramic casting may generally include the operations set forth above, as well as, continuously (or periodically) vacuuming the cavity of the component mold including the ceramic-based slurry mixture for a predetermined time. Additionally, the method may include forming a ceramic component within the continuously vacuumed cavity of the component mold over the duration of the predetermined time. The ceramic component may be formed from the ceramic-based slurry mixture.

These and other embodiments are discussed below with reference to FIGS. 1-3I. However, those skilled in the art will readily appreciate that the detailed description given herein with respect to these Figures is for explanatory purposes only and should not be construed as limiting.

Referring now to FIGS. 1A and 1B, a perspective view of one example of a ceramic-based slurry mixture 100 is shown. In an embodiment, as shown in FIG. 1A, ceramic-based slurry mixture 100 may include a first material 102 and a second material 104. More specifically, ceramic-based slurry mixture 100 may be made from the combination of first material 102 and second material 104, as shown in FIG. 1B. Each of first material 102 and second material 104 may be made from distinct materials that may chemically react with one another to begin a curing process of ceramic-based slurry mixture 100, as discussed herein. That is, and as discussed herein, first material 102 and second material 104 may be combined to form ceramic-based slurry mixture 100, which may subsequently begin to cure after and may ultimately form a ceramic component (FIG. 3F). In a non-limiting embodiment, first material 102 may include any conventional pre-mixed epoxy material. Additionally, and as discussed herein, first material 102 may also include any conventional dispensate material, which may aid in substantially even dispensing or dispersion of particles included within first material 102. In a non-limiting example, second material 104 may include any conventional epoxy harder material. That is, second material 104 may include any conventional epoxy reactant material that may cause first material 102 to harden when second material 104 is mixed with first material 102. In non-limiting examples, the first material 102 and second material 104 may include, or may be mixed to form a polyester-based epoxy or an acrylate epoxy.

As shown in FIGS. 1A and 1B, at least one of first material 102 and second material 104 may include a plurality of zirconia particles 106. More specifically, only first material 102 may include a plurality of zirconia particles 106 suspended within first material 102. As shown in FIG. 1A, the plurality of zirconia particles 106 may be distributed evenly throughout first material 102, such that at any viscosity of first material 102, a substantially homogenous dispersion of the plurality of zirconia particles 106 may be present within the materials. That is, the plurality of zirconia particles 106 may not be undesirably gathered at the top or bottom surface of first material 102, dependent upon the buoyancy properties of first material 102. Rather the plurality of zirconia particles 106 may evenly "float" throughout the material. The even distribution or dispersion of the plurality of zirconia particles 106 may be a result of the dispensate material included in first material 102. That is, the dispensate material included in first material 102 may ensure that the plurality of zirconia particles 106 may be evenly distributed or dispersed throughout the entirety of first material 102.

In an alternative embodiment, zirconia particles 106 may not be distributed evenly through at least one of first material 102 and second material 104. In the alternative embodiment where zirconia particles 106 are not distributed evenly in first material 102 and/or second material 104, zirconia particles 106 may be evenly distributed when combined to form ceramic-based slurry mixture 100, as discussed herein. Additionally as discussed herein, homogenous dispersion of the plurality of zirconia particles 106 within first material 102 and/or second material 104 may aid in forming a rigid ceramic component having a substantially uniform density.

As shown in FIG. 1B, when first material 102 and second material 104 are combined to form ceramic-based slurry mixture 100, air bubbles 108 or small pockets of air may be formed in ceramic-based slurry mixture 100. More specifically, as a result of combining and/or mixing first material 102, including zirconia particles 106, and second material 104, a plurality of air bubbles 108 may be formed within and dispersed throughout ceramic-based slurry mixture 100. As shown in FIG. 1B, air bubbles 108 may be dispersed unevenly through ceramic-based slurry mixture 100, and may be adjacent to and/or substantially surround zirconia particles 106 formed in ceramic-based slurry mixture 100.

The air bubbles 108 may be formed within ceramic-based slurry mixture 100 as a result of air being trapped between or within first material 102 and second material 104 during the combining process to form ceramic-based slurry mixture 100. For example, when first material 102 and second material 104 are poured into a mixing container 110 and stirred to form ceramic-based slurry mixture 100, air bubbles 108 may be formed from air trapped in container 110 by the respective materials, or may enter into the material through the stirring action. As discussed herein, air bubbles 108 may cause undesirable defects (e.g., cosmetic, structural, etc.) in a ceramic component (discussed in more detail below with respect to FIG. 3G).

Turning to FIG. 2, a process of ceramic component casting may now be discussed. Specifically, FIG. 2 is a flowchart depicting one sample method 200 for manufacturing or casting ceramic component.

Figure 3A:
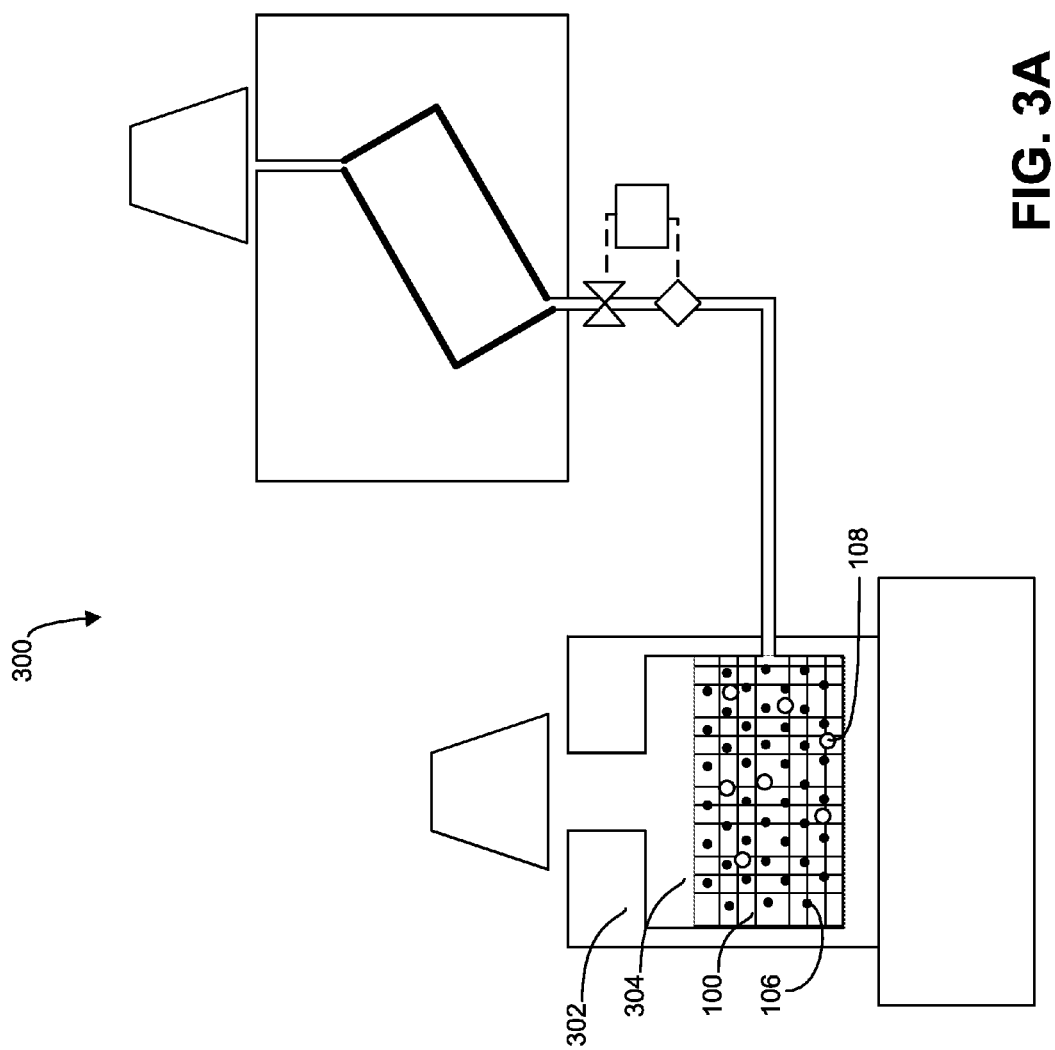
FIGS. 3A-3G show illustrative views of a casting system, including a ceramic-based slurry mixture, undergoing processes of casting as depicted in FIG. 2, according to embodiments.

In operation 202, ceramic-based slurry mixture 100 may be provided to a casting system (see, FIG. 3A). More specifically, ceramic-based slurry mixture 100 may be poured or placed in a casting system for forming a ceramic component (one example of which is shown in FIG. 3G), as discussed herein. Ceramic-based slurry mixture 100 may be provided to casting system pre-mixed, or first material 102 and second material 104 (as shown in FIGS. 1A and 1B) forming ceramic-based slurry mixture 100 may be combined within the casting system. That is, ceramic-based slurry mixture 100 may be formed and subsequently disposed within the casting system, or ceramic-based slurry mixture 100 may be formed directly in the casting system.

In operation 204, ceramic-based slurry mixture 100 may be vacuumed. More specifically, in operation 204, ceramic-based slurry mixture 100 may be subject to a vacuum to cause a pressure differential. By subjecting ceramic-based slurry mixture 100 to a vacuum, air bubbles 108 may migrate through ceramic-based slurry mixture 100 to low pressure region, which may ultimately remove air bubbles 108 from ceramic-based slurry mixture 100. As discussed herein, by removing air bubbles 108 prior to placing ceramic-based slurry mixture 100 into a ceramic component mold (as described in more detail below with respect to operation 208) of the casting system, defects (whether cosmetic or structural) of the ceramic component formed from ceramic-based slurry mixture 100 may be substantially minimized and/or eliminated.

In operation 206, a vacuum or near-vacuum may be induced in the component mold of the casting system. More specifically, in operation 206, a cavity of the component mold of the casting system may be subject to a vacuum to substantially remove air from the component mold. By initially removing air from the component mold before further operations are performed by casting system 300, the risk of defects in ceramic component may be substantially minimized and/or eliminated, as discussed herein.

It is understood that operation 204 and operation 206 may be performed simultaneously within system 300. That is, ceramic-based slurry mixture 100 may be subject to a vacuum at the same time that the component mold of the casting system is subject to a vacuum. Furthermore, it is understood that ceramic-based slurry mixture 100 may be vacuumed for a predetermined time to substantially remove air and/or air bubbles 108, and may be subsequently plugged to prevent additional air and/or air bubbles 108 from forming within the casting system.

In operation 208, ceramic-based slurry mixture 100 may be disposed into the cavity of the component mold of the casting system. The disposing or providing of ceramic-based slurry mixture 100 may include flowing ceramic-based slurry mixture 100 to the cavity from below the component mold. That is, the ceramic-based slurry mixture 100 may be provided in a manner to fill the cavity of the component mold of the casting system from the bottom of the cavity to the top of the cavity. The disposing of ceramic-based slurry mixture 100 in operation 208 may also include supplying a predetermined amount of ceramic-based slurry mixture 100 to the component mold of the casting system. That is, dependent upon the geometry of the cavity of the component mold, as discussed herein, a predetermined amount of ceramic-based slurry mixture 100 may be supplied to the component mold of the casting system. During the disposing process in operation 208, air bubbles 108 may be formed in ceramic-based slurry mixture 100 disposed in the component mold of the casting system. That is, the disposing process in operation 208 may cause existing air bubbles 108 in the casting system or new air bubbles 108 to be formed in the predetermined amount of ceramic-based slurry mixture 100 disposed or provided to the component mold of the casting system.

In optional operation 210 (shown in phantom), the cavity of the component mold, including ceramic-based slurry mixture 100, may be continuously vacuumed for a predetermined time. As similarly discussed with respect to operation 204, in operation 210, ceramic-based slurry mixture 100 included in the component mold of the casting system may be subject to a vacuum to cause a pressure differential. By subjecting ceramic-based slurry mixture 100 to a vacuum, air bubbles 108 may migrate through ceramic-based slurry mixture 100 to low pressure region, which may ultimately remove air bubbles 108 from ceramic-based slurry mixture 100 disposed in the component mold of the casting system.

In operation 212, cavity 314 of component mold 316 may be vacuumed subsequent to the disposing of ceramic-based slurry mixture 100 in operation 208. As similarly discussed above, in operation 212, ceramic-based slurry mixture 100 included in the component mold of the casting system may be subject to a vacuum. In operation 212, the subjecting of ceramic-based slurry mixture 100 to vacuum while in the mold 316 may substantially ensure that ceramic-based slurry mixture 100 is free from air bubbles 108 prior to further processing within the casting system.

In operation 214, a ceramic component may be formed from ceramic-based slurry mixture 100 within the cavity of the component mold over a duration of predetermined time. More specifically, ceramic-based slurry mixture 100 including zirconia particles 106 may cure over a duration of predetermined time to form a substantially rigid, zirconia based component (e.g., ceramic component). The predetermined time for forming ceramic component 342 may be dependent, at least in part, on chemical properties of ceramic-based slurry mixture 100. That is, the predetermined time for forming the ceramic component may be dependent upon the composition of first material 102 and second material 104 forming ceramic-based slurry mixture 100, and the chemical reaction that may take place when combining first material 102 and second material 104 to form ceramic-based slurry mixture 100, as discussed herein. The predetermined time may take an extended period of time because of its reliance of the reaction between first material 102 and second material 104. For example, the predetermined time to form ceramic component 342 may include approximately thirty (30) minutes.

Turning to FIGS. 3A-3G, a sample casting system 300 undergoing various operations of method 200 of FIG. 2 may be depicted. Additionally, FIGS. 3H and 3I depict a sample ceramic component formed using casting system 300. It is understood that similarly numbered components may function in a substantially similar fashion. Redundant explanation of these components has been omitted for clarity.

As shown in FIG. 3A, ceramic-based slurry mixture 100 may be disposed, provided, and/or contained in a chamber 304 of a supply tank 302 of casting system 300, to be used in casting ceramic component, as discussed herein. Ceramic-based slurry mixture 100 contained in supply tank 302, as shown in FIG. 3A, may correspond to operation 202 of FIG. 2. Ceramic-based slurry mixture 100 may be provided to supply tank 302 pre-mixed, or first material 102 and second material 104 may be combined within supply tank 302 to form ceramic-based slurry mixture 100. That is, ceramic-based slurry mixture 100 may be formed and subsequently disposed within supply tank 302 of casting system 300, or ceramic-based slurry mixture 100 may be formed directly in supply tank 302. Supply tank 302 of casting system 300 may include any conventional storage component capable of storing substantially liquid material (e.g., ceramic-based slurry mixture 100).

Figure 3B:
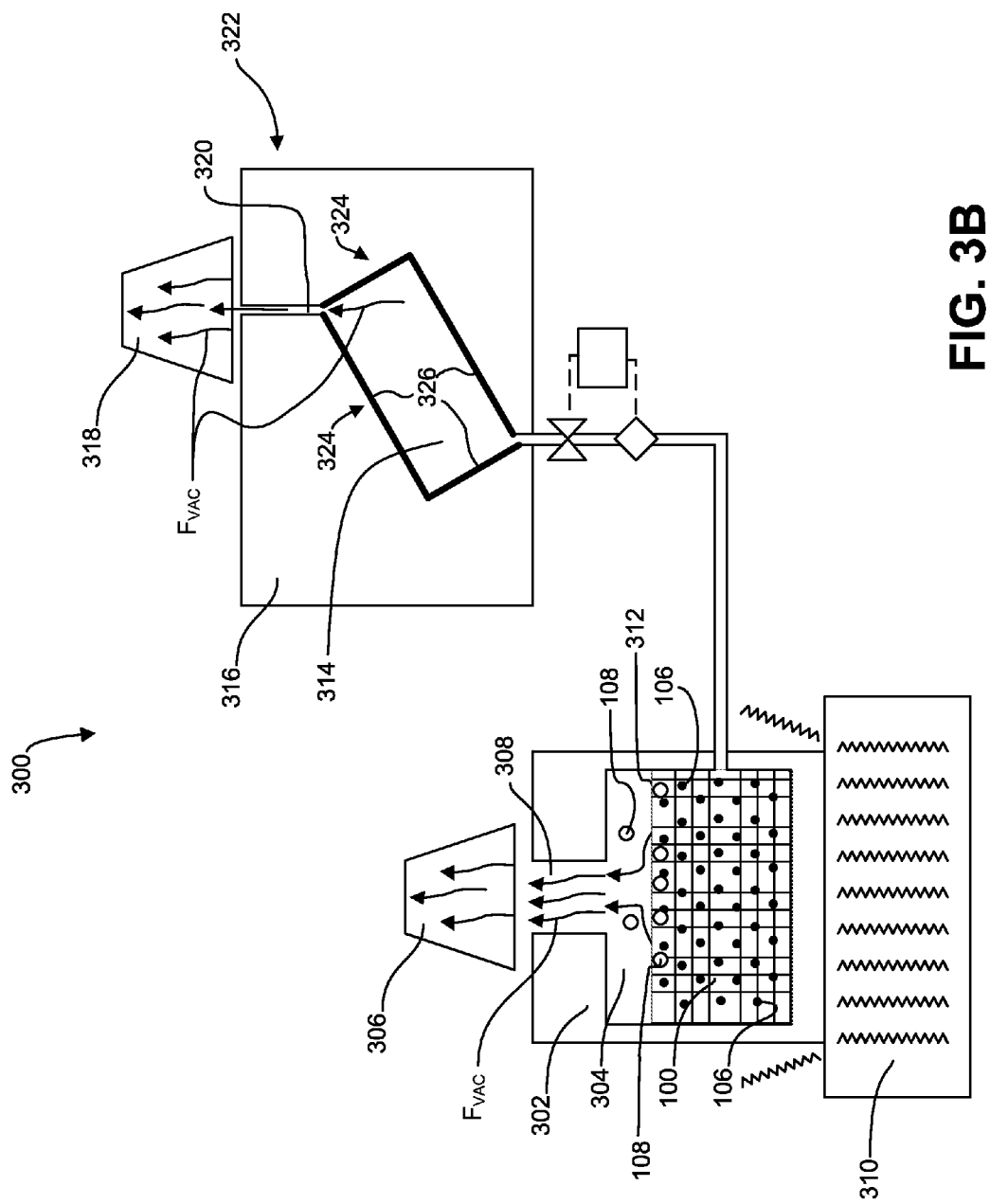

As shown in FIG. 3B, a supply tank vacuum 306 may be in fluid communication with chamber 304 via a tank opening 308 to subject ceramic-based slurry mixture 100 to a vacuum pressure, as referenced above with respect to operation 204 in FIG. 2. In an example embodiment, supply tank vacuum 306 may be positioned adjacent tank opening 308 of supply tank 302 to substantially vacuum ceramic-based slurry mixture 100 included in chamber 304 of supply tank 302. Supply tank vacuum 306 may vacuum ceramic-based slurry mixture 100 to substantially remove air bubbles 108 that may be formed in ceramic-based slurry mixture 100, as discussed herein. As shown in FIG. 3B, supply tank vacuum 306 may simultaneously remove air within chamber 304 of supply tank 302 and remove air bubbles 108 formed in ceramic-based slurry mixture 100 by applying a vacuum force ($F_{VAC}$) within supply tank 302.

As shown in FIG. 3B, further operations may be performed on ceramic-based slurry mixture 100 of supply tank 302 during the vacuuming in operation 204 of FIG. 2. For example, supply tank 302 may be coupled to or positioned on a vibration component 310 of casting system 300, where vibration component 310 may provide vibrations to ceramic-based slurry mixture 100 prior to the performance of additional operations of casting system 300 (e.g., disposing in operation 208). Vibration component 310 may provide a vibration to supply tank 302 including ceramic-based slurry mixture 100, to aid in the removal of air bubbles 108 formed within ceramic-based slurry mixture 100. More specifically, as shown in FIG. 3B, vibration component 310 may provide a vibration to supply tank 302 and ceramic-based slurry mixture 100 included in supply tank 302 to move air bubbles 108 to the top surface 312 of ceramic-based slurry mixture 100. By moving air bubbles 108 to top surface 312 of ceramic-based slurry mixture 100, air bubbles 108 may dissipate into chamber 304 and/or be removed from ceramic-based slurry mixture 100 by the vacuum force ($F_{VAC}$) applied by supply tank vacuum 306. The vibration component 310 may include any conventional vibration system which may provide vibrations to move air bubbles 108 of ceramic-based slurry mixture 100 to top surface 312. For example, the provided vibration systems may include, but are not limited to: physical vibration system, ultrasonic vibration system, or rotary vibration system.

As shown in FIG. 3B, mold vacuum 318 may be in fluid communication with cavity 314 of component mold 316 via a vacuum conduit 320 to vacuum air from cavity 314. Subjecting cavity 314 of component mold 316 using mold vacuum 318 may correspond to operation 206 of FIG. 2. As similarly discussed with respect to supply tank 302 and supply tank vacuum 306, mold vacuum 318 of casting system 300 may apply a vacuum force ($F_{VAC}$) to remove air from cavity 314, prior to further operations being performed by casting system 300. As shown in FIG. 3B, vacuum conduit 320 may be positioned through a top portion 322 of component mold 316, such that mold vacuum 318 may draw air included in cavity 314 of component mold 316 from vacuum conduit 320.

As shown in FIG. 3B, cavity 314 of component mold 316 may include a unique or custom geometry, that may be utilized to form a ceramic component (FIG. 3G). That is, cavity 314 may include an opening having a custom geometry that may shape ceramic-based slurry mixture 100 used to form ceramic component during the casting process discussed herein. Cavity 314, as shown in FIG. 3B, may be angularly oriented within component mold 316. More specifically, cavity 314 may be formed or oriented within component mold 316 to include at least one angular sidewall 324 positioned adjacent vacuum conduit 320 of component mold 316. As discussed herein, angular sidewall 324 of cavity 314 may aid in allowing air and/or air bubbles 108 to move within cavity 314 to be positioned adjacent vacuum conduit 320, and be subsequently removed from cavity 314 via mold vacuum 318. Additionally as shown in FIG. 3B, cavity 314 may include a coating 326. Coating 326 may include any conventional material having substantially hydrophobic properties. As discussed herein, coating 326 may also aid in allowing air bubbles 108 to move through ceramic-based slurry mixture 100 disposed in cavity 314 (e.g., operation 208), to be positioned adjacent vacuum conduit 320, and be subsequently removed from cavity 314 via mold vacuum 318.

Supply tank vacuum 306 and mold vacuum 318 may include distinct vacuum systems (not shown) or may be two distinct vacuum hoses included in a single-vacuum system (not shown).

Figure 3C:
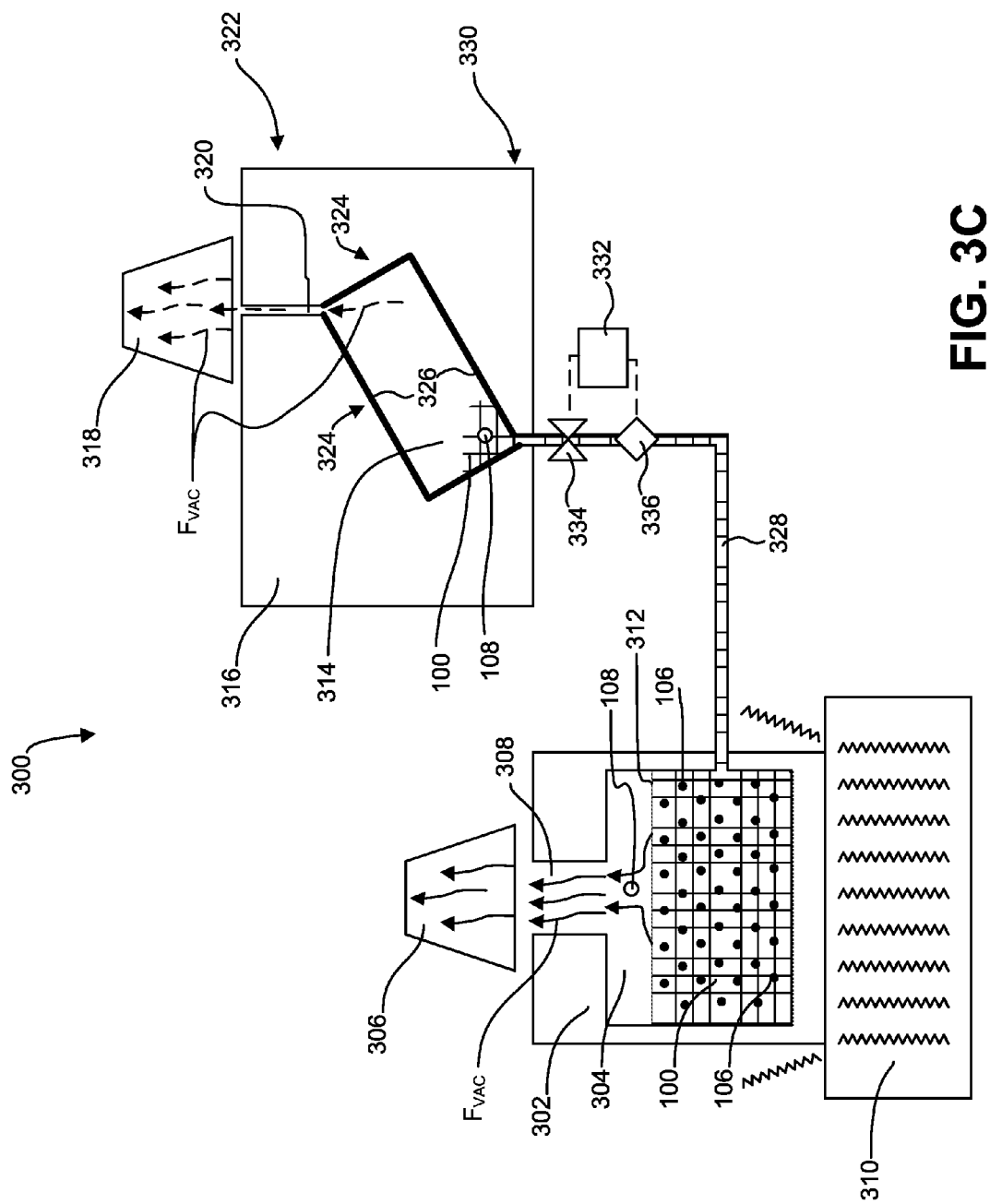
Figure 3D:
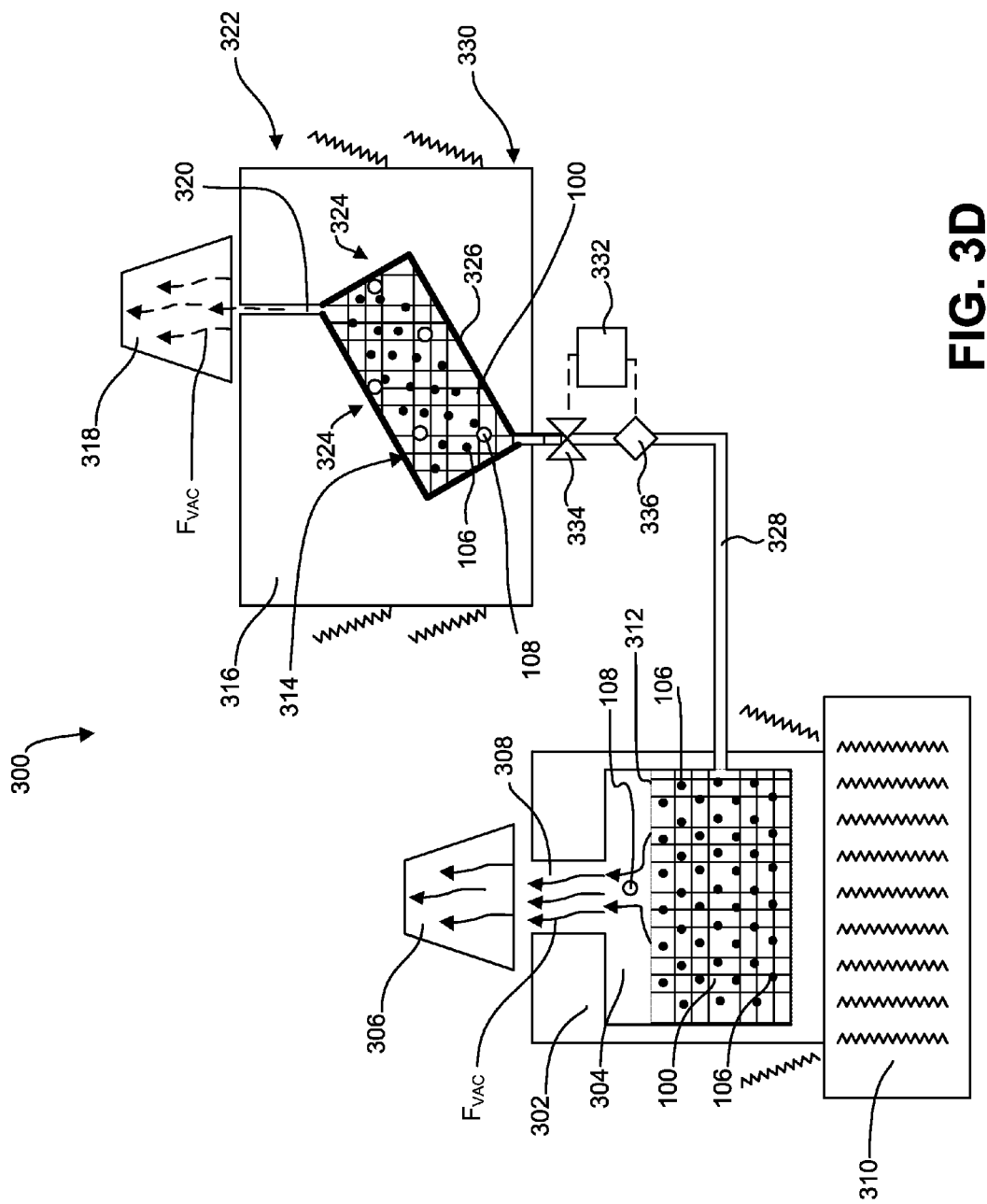
Figure 3E:
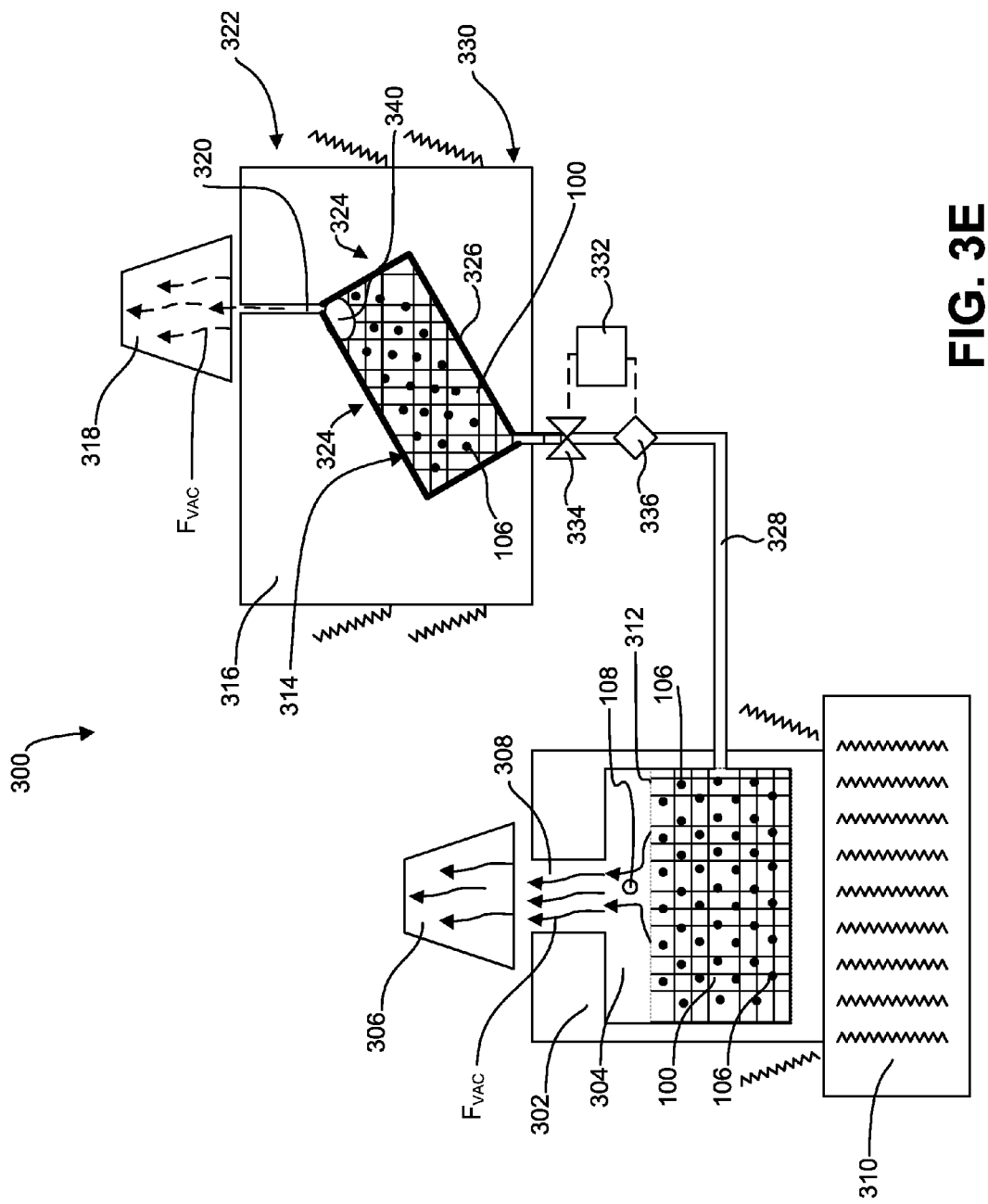
Figure 3F:
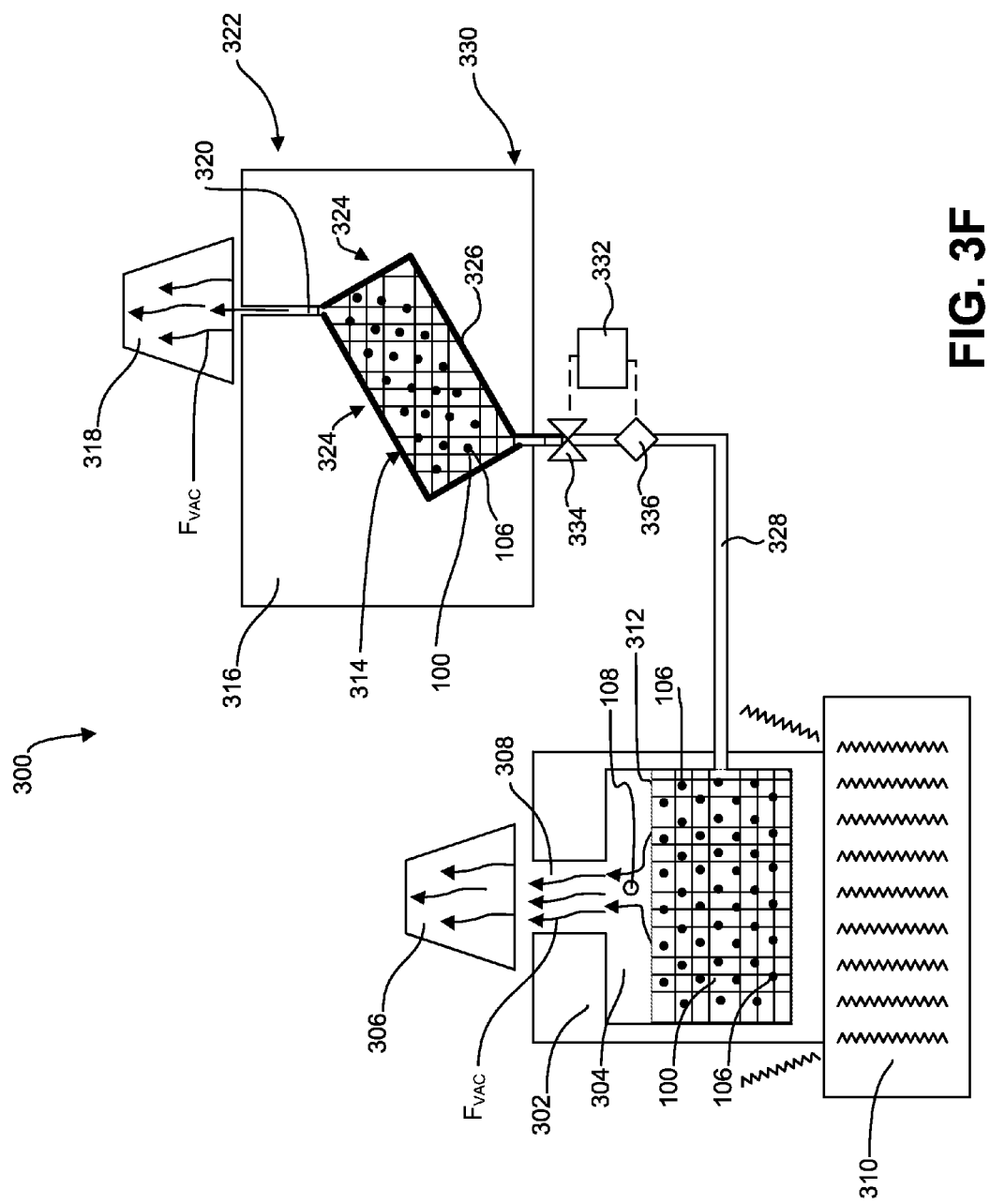
Figure 3G:
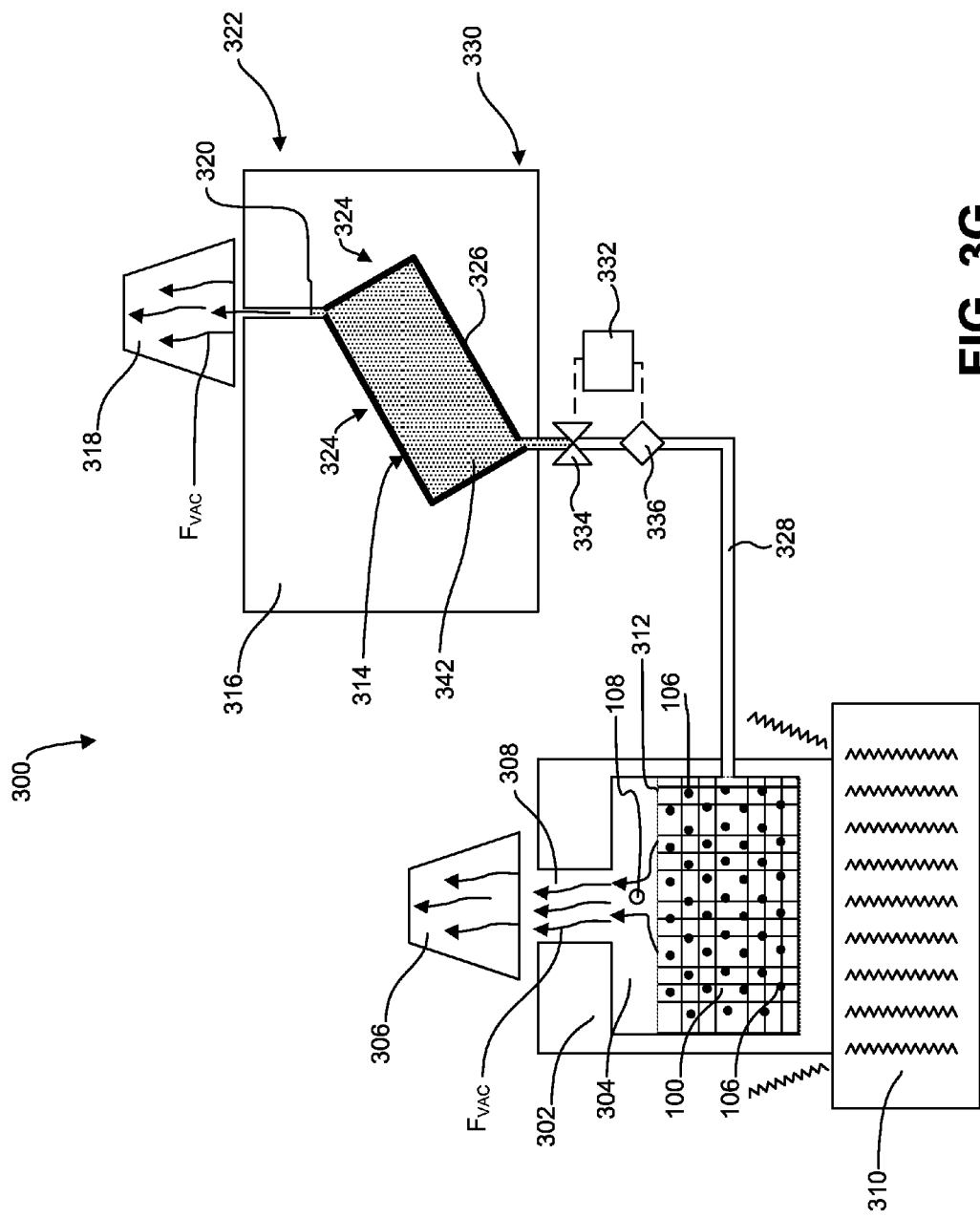
Figure 3H:
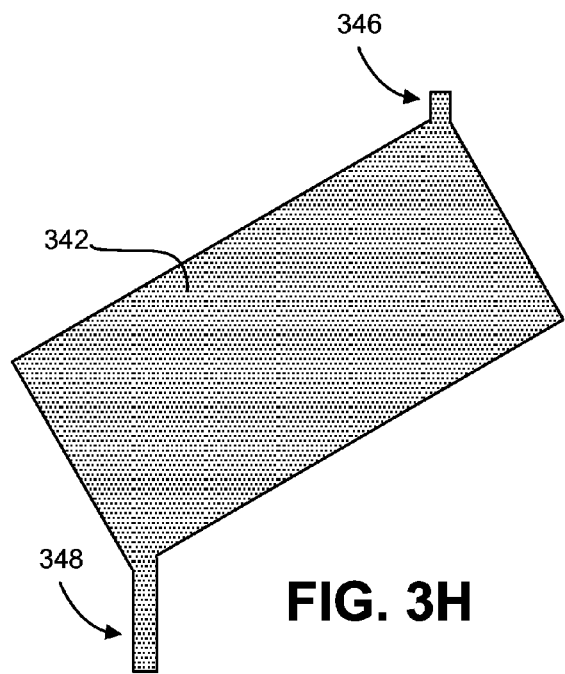
FIGS. 3H and 3I show an illustrative ceramic component formed by processes of casting as depicted in FIG. 2, according to embodiments.
Figure 3I:
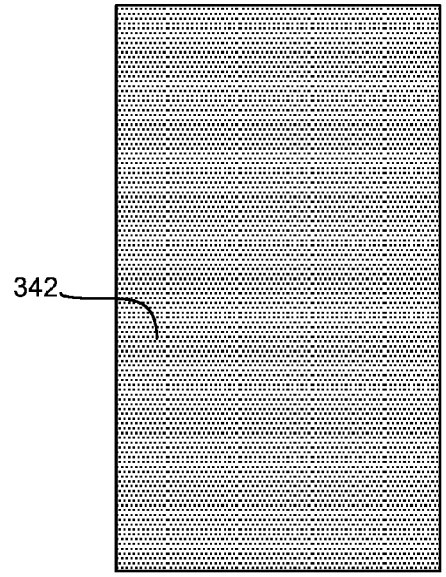

As shown in FIGS. 3C-3E, ceramic-based slurry mixture 100 included in supply tank 302 may be disposed within cavity 314 of component mold 316, as similarly discussed with respect to operation 208 of FIG. 2. That is, and discussed herein, the combination of first material 102 and second material 104 forming ceramic-based slurry mixture 100, may be provided to cavity 314 of component mold 316 via a supply conduit 328 of casting system 300. As shown in FIGS. 3C-3E, supply conduit 328 may fluidly couple chamber 304 of supply tank 302 including ceramic-based slurry mixture 100 and cavity 314 of component mold 316. More specifically, as shown in FIG. 3C-3E, component mold 316 may be elevated above supply conduit 328, and/or supply conduit 328 may be coupled to a bottom portion 330 of component mold 316. In coupling supply conduit 328 to bottom portion 330 of component mold 316, cavity 314 of component mold 316 may be filled with ceramic-based slurry mixture 100 from bottom portion 330 to top portion 322. That is, FIGS. 3C-3E may show a progression of ceramic-based slurry mixture 100 being disposed within cavity 314 of component mold 316 to fill cavity 314 from bottom portion 330 to top portion 322. Ceramic-based slurry mixture 100 may be supplied from supply tank 302 to cavity 314 using any conventional fluid flow technique or device (not shown) including, but not limited to: gravity feed, fluid pump, and pressure flow.

As discussed with respect to operation 208 in FIG. 2, the predetermined amount of ceramic-based slurry mixture 100 supplied to cavity 314 may be measured and/or regulated using any conventional technique for controlling fluid flow within a system (e.g., casting system 300). For example, fluid control system 332 (hereafter, "control system 332") may be utilized to supply the predetermined amount of ceramic-based slurry mixture 100 to cavity 314 of component mold 316. As shown in FIGS. 3C-3E, control system 332 may include a valve 334 in fluid communication with supply conduit 328, and a flow sensor 336 positioned within supply conduit 328, and in electronic communication with control system 332. Valve 334 may be configured to substantially open and/or close supply conduit 328, such that when valve 334 is open, ceramic-based slurry mixture 100 may flow to cavity 314, and when valve 334 is closed, ceramic-based slurry mixture 100 may not flow to cavity 314. Flow sensor 336 may be configured to determine flow characteristics of ceramic-based slurry mixture 100 flowing through supply conduit 328. The flow characteristics of ceramic-based slurry mixture 100 may include, but are not limited to: flow volume of ceramic-based slurry mixture 100, flow speed of ceramic-based slurry mixture 100, and duration of flow time for ceramic-based slurry mixture 100. Control system 332 may be configured to receive flow characteristics from sensor 336 and determine if the predetermined amount of ceramic-based slurry mixture 100 has been supplied to cavity 314. When control system 332 determines that the predetermined amount of ceramic-based slurry mixture 100 is supplied to cavity 314, as shown in FIG. 3D, control system 332 may close valve 334 to prevent any additional ceramic-based slurry mixture 100 from entering cavity 314 of component mold 316. As shown in FIG. 3D, cavity 314 may be substantially supplied with the predetermined amount of ceramic-based slurry mixture 100, and any remaining ceramic-based slurry mixture 100 within supply conduit 328 may backflow into supply tank 302.

As shown in FIGS. 3C-3E, during the disposing of ceramic-based slurry mixture 100 in operation 208 in FIG. 2, air bubbles 108 may be formed within ceramic-based slurry mixture 100 disposed in cavity 314. More specifically, as ceramic-based slurry mixture 100 is disposed in cavity 314 of component mold 316, air bubbles 108 may be included in and dispersed throughout the predetermined amount of ceramic-based slurry mixture 100 disposed in cavity 314. Air bubbles 108 included in cavity 314 may include air bubbles 108 not substantially removed from ceramic-based slurry mixture 100 in chamber 304 of supply tank 302, as discussed above. Additionally, air bubbles 108 may include new air bubbles 108 formed in the predetermined amount of ceramic-based slurry mixture 100 included in cavity 314. The newly formed air bubbles 108 may be formed from air trapped in supply conduit 328, air trapped in cavity 314 of component mold 316 and/or may be air bubbles 108 formed from ceramic-based slurry mixture 100 being disposed into cavity 314 with an undesirable flow rate (e.g., splashing in cavity 314).

Turning to FIG. 3E, as result of the angular orientation of cavity 314 and/or coating 326 of cavity 314, the plurality of air bubbles may be combined to form a single air bubble 340 positioned in top portion 322 of component mold 316. More specifically, as a result of angled sidewalls 324 being angled toward vacuum conduit 320 of component mold 316 and coating 326 of cavity 314 including hydrophobic properties, the plurality of air bubbles 108 of ceramic-based slurry mixture 100 may move along angled sidewalls 324, toward top portion 322, and may be directed toward vacuum conduit 320 by angled sidewalls 324. Where coating 326 includes hydrophobic properties, coating 326 of cavity 314 may repel air bubbles 108 away from coating 326, and angled sidewalls 324 may carry air bubbles to the only portion of cavity 314 that does not include coating 326—vacuum conduit 320. As the plurality of air bubbles 108 are positioned adjacent vacuum conduit 320, they may combine to form a single, large air bubble 340, that may be adjacent to, or substantially positioned in alignment with vacuum conduit 320. As shown in FIG. 3E, once air bubbles 108 move toward vacuum conduit 320 of component mold 316 and form single air bubble 340, the remainder of cavity 314, including ceramic-based slurry mixture 100, may be substantially free from air bubbles 108. As such, ceramic-based slurry mixture 100 in cavity 314 may substantially prevent defects from being formed within ceramic component, as a result of the removal of all air bubbles 108 and single air bubble 340.

Also shown in FIGS. 3D and 3E, component mold 316 including ceramic-based slurry mixture 100 within cavity 314 may be substantially vibrated. That is, and as similarly discussed with respect to supply tank 302 as shown in FIG. 3B, a vibration may be provided to ceramic-based slurry mixture 100 subsequent to the disposing of ceramic-based slurry mixture 100 into cavity 314 of component mold 316. The vibrations provided to component mold 316 including ceramic-based slurry mixture 100 may aid in allowing the plurality of air bubbles 108 formed in cavity 314 (FIG. 3D), move along angled sidewalls 324 of cavity 314 and collect/form single air bubble 340 adjacent vacuum conduit 320 of component mold 316 (FIG. 3E). The vibrations may be provided to component mold 316 using any conventional device and/or conventional technique as discussed herein. For example, and similarly discussed with respect to FIG. 3B, component mold 316 may be coupled to a distinct vibration component 310 (not shown) to provide vibrations to ceramic-based slurry mixture 100 include in cavity 314 of component mold 316.

As shown in FIGS. 3C-3E, mold vacuum 318 may continuously apply a vacuum force ($F_{VAC}$)(shown in phantom) for removing air/air bubbles 108 formed within cavity 314 during the disposing of ceramic-based slurry mixture 100 within cavity 314 of component mold 316. The continuous vacuuming of mold vacuum 318 may correspond to optional operation 210 of FIG. 2. The vacuuming of cavity 314 of component mold 316 in operation 206 may be continuous, and may continue through the disposing of ceramic-based slurry mixture 100 into cavity 314 of component mold 316, such that a vacuuming of cavity 314 and the disposing of ceramic-based slurry mixture 100 into cavity 314 occur simultaneously. The predetermined time for continuously vacuuming cavity 314 may be dependent upon a number of factors including, but not limited to: flow volume of ceramic-based slurry mixture 100, flow speed of ceramic-based slurry mixture 100, and duration of flow time for the predetermined amount of ceramic-based slurry mixture 100 provided to cavity 314. As discussed herein, the continuous vacuuming of cavity 314 including ceramic-based slurry mixture 100 may aid in the removal of undesirable air bubbles 108 that may be formed during the disposing process As shown in FIG. 3F, mold vacuum 318 may apply a final vacuum force ($F_{VAC}$) to cavity 314 including the predetermined amount of ceramic-based slurry mixture 100, to substantially ensure that ceramic-based slurry mixture 100 is free from air bubbles 108. Applying the final vacuum force ($F_{VAC}$) using mold vacuum 318 may correspond to operation 212 of FIG. 2. After the predetermined amount of ceramic-based slurry mixture 100 is disposed or flowed to cavity 314, mold vacuum 318 may apply a vacuum force ($F_{VAC}$) to remove single air bubble 340. This final vacuum force ($F_{VAC}$) may substantially ensure that a ceramic component (FIG. 3G) formed from ceramic-based slurry mixture 100 in cavity 314 may be free from defects caused by air bubbles 108/single air bubble 340. As shown in FIG. 3F, single air bubble 340, and the plurality of air bubbles (FIG. 3D) forming single air bubble 340, may be removed from cavity 314 via mold vacuum 318. As a result, ceramic-based slurry mixture 100 included in cavity 314 of component mold 316 may be ready for further processing by casting system 300 to form ceramic component (FIG. 3G).

FIG. 3G shows ceramic-based slurry mixture 100 included in cavity 314 curing to form substantially rigid ceramic component 342, which may correspond to operation 214 of FIG. 2. More specifically, ceramic-based slurry mixture 100 including zirconia particles 106 may cure over a duration of predetermined time to form a substantially rigid, zirconia based component (e.g., ceramic component 342). In comparing FIGS. 3F and 3G, during the curing process zirconia particles 106 may aid in the formation of ceramic component 342. More specifically, as shown in FIG. 3F, and discussed herein, zirconia particles 106 may be dispersed evenly throughout ceramic-based slurry mixture 100. As the curing process becomes complete, and ceramic component 342 of FIG. 3G is formed, the plurality of evenly distributed zirconia particles 106 may aid in forming rigid ceramic component 342 to include a substantially uniform density. That is, and discussed herein, where zirconia particles 106 are evenly distributed throughout ceramic-based slurry mixture 100 during the forming or curing process, ceramic component 342 may include a substantially uniform density.

Because of ceramic-based slurry mixture 100 composition (e.g., first material 102, second material 104) and the respective chemical reaction that takes place in combining the materials to form ceramic-based slurry mixture 100, the forming of ceramic component 342 may occur without performing additional processes on ceramic-based slurry mixture 100. More specifically, once ceramic-based slurry mixture 100 is disposed in cavity 314 of component mold 316 and air bubbles 108/single air bubble 340 are vacuumed from cavity 314, ceramic-based slurry mixture 100 used to form ceramic component 342 may only require curing time. As such, the forming of ceramic component 342 may include reasonably maintaining an ambient temperature surrounding component mold 316 including ceramic-based slurry mixture 100, and reasonably maintaining a minimal compression force on ceramic-based slurry mixture 100 included in component mold 316. That is, ceramic-based slurry mixture 100 does not require any heating or cooling to form ceramic component 342 during the forming process, nor does ceramic-based slurry mixture 100 require a large compression force after being disposed in cavity 314 to form ceramic component 342. The minimal compression force on ceramic-based slurry mixture 100 may include a compression force that may hold a two-part component mold 316 together. Where component mold 316 includes a single, integral component, the minimal compression force on ceramic-based slurry mixture 100 may include atmospheric pressure.

It is understood that mold vacuum 318 may continuously vacuum cavity 314 during the forming of ceramic component 342 in operation 214. That is, cavity 314 may be continuously vacuumed during the forming process to substantially prevent air bubbles 108 from being undesirably included in ceramic-based slurry mixture 100 and/or ceramic component 342. Additionally, the continuous vacuuming during the forming process may substantially prevent or eliminate the risk of air becoming trapped in cavity 314 and negatively affecting ceramic component 342 by creating a cosmetic defect (e.g., bump or divot) and/or creating a variable density in ceramic component 342, as discussed above.

Once formed, ceramic component 342 may be removed from component mold 316 and may be further processed if necessary. As shown in FIG. 3H, substantially rigid ceramic component 342 formed from casting system 300 may be shown, subsequent to the removal from component mold 316. Ceramic component 342 may be removed from component mold 316 and may be immediately implemented into a component, device or system that may utilize ceramic component 342. Alternatively, and as shown in FIGS. 3H and 3I, ceramic component 342 may require further machining. More specifically, as shown in FIG. 3H, ceramic component 342 may include protrusions 346, 348. Protrusion 346 may be formed from a portion of ceramic-based slurry mixture 100 that may be positioned within vacuum conduit 320 of component mold 316 during the forming process. Protrusion 348 may be formed from a portion of ceramic-based slurry mixture 100 that may be positioned in component mold 316 between cavity 314 and supply conduit 328 during the forming process. Where it is desired for ceramic component 342 to be substantially rectangular, these undesirable protrusions 346, 348 may be removed from ceramic component 342. More specifically, a material removal process may be performed on ceramic component 342 to remove protrusions 346, 348, and make ceramic component 342 into a desirable/required geometry, as shown in FIG. 3I. The material removal process used on ceramic component 342 may include any conventional material removal process including, but not limited to: grinding, milling, turning, and cutting.

By utilizing ceramic-based slurry mixture 100, which may cure itself based on the chemical reaction between first material 102 and second material 104, ceramic component 342 may be formed without the manufacturing stresses (e.g., rapid heating-cooling, high compression force) typically associated with conventional ceramic casting. These stresses associated with conventional manufacturing processes typically attribute to the formation of defects in conventional ceramic components. By eliminating the use of rapid heating and cooling, and/or the use of high compression forces in forming ceramic component 342, the risk in defects formed in ceramic component 342 may be substantially reduced and/or eliminated.

Additionally, by utilizing ceramic-based slurry mixture 100 to form ceramic component 342, and eliminating the rapid heating-cooling and/or high compression force in the formation process, component mold 316 may be manufactured from less expensive and more easily manufactured material. That is, with respect to process of forming ceramic component 342 discussed above, component mold 316 may not undergo rapid temperature changes and/or high compression forces. As such, component mold 316 may not require materials that are resistant to rapid temperature changes and/or high compression forces, which typically includes very expensive and difficult material to machine. Rather, component mold 316 may be manufactured from easier machined material that is more cost effective. Additionally, because component mold 316 may be manufactured from material that is more easily machined and/or more cost effective, and because no heating-cooling and/or compression force is required, a plurality of component molds 316 may be manufactured. As a result, a large number of ceramic components 342 may be formed or manufactured simultaneously.

Furthermore, although only a basic, rectangular geometry is discussed above, it is understood that cavity 314 of component mold 316 may include more intricate geometric configurations for forming ceramic component 342. More specifically, because component mold 316 may be formed from more easily machined material, as discussed above, cavity 314 used to form ceramic component 342 may be more intricate, and may include very specific geometries for ceramic component 342. As such, ceramic component 342 may include exact or substantially precise, intricate geometries when removed from component mold 316, and may require minimal or no additional machining prior to being implemented within a component, device or system.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. A method comprising:
vacuuming a ceramic-based slurry mixture to remove air bubbles from the ceramic-based slurry mixture;
establishing a vacuum state in a component mold to remove air bubbles from a cavity of the component mold;
introducing the ceramic-based slurry mixture into the component mold while maintaining the vacuum state; and
forming a ceramic component within the cavity of the component mold from the ceramic-based slurry mixture while maintaining the vacuum state for a period of time.

2. The method of claim 1, further comprising providing vibrations to the ceramic-based slurry mixture prior to the introducing of the ceramic-based slurry mixture.

3. The method of claim 2, further comprising providing the vibrations to the ceramic-based slurry mixture subsequent to the introducing of the ceramic-based slurry mixture into the cavity of the component mold.

4. The method of claim 3, wherein the provided vibrations include at least one of a physical vibration, an ultrasonic vibration, or a rotary vibration.

5. The method of claim 1, wherein the forming of the ceramic component includes forming a zirconia component.

6. The method of claim 1, wherein the introducing the ceramic-based slurry mixture further includes supplying a predetermined amount of the ceramic-based slurry mixture to the cavity of the component mold via a supply tank.

7. The method of claim 1, wherein the vacuuming of the component mold removes air bubbles from the ceramic-based slurry mixture as the ceramic-based slurry mixture fills the cavity of the component mold.

8. The method of claim 1, wherein the forming of the ceramic component within the cavity of the component mold comprises:
reasonably maintaining an ambient temperature surrounding the component mold including the ceramic-based slurry mixture; and
reasonably maintaining a minimal compression force within the component mold including the ceramic-based slurry mixture.

9. The method of claim 1, wherein the cavity of the component mold is filled from a bottom portion of the cavity to a top portion of the cavity.

10. The method of claim 1, wherein:
the component mold defines a non-horizontal sidewall adjacent to an opening and configured to direct air bubbles toward the opening, wherein the non-horizontal sidewall is a first non-horizontal sidewall positioned on a first side of the opening; and
the component mold further defines a second non-horizontal sidewall positioned on a second side of the opening.

11. A method comprising:
vacuuming a chamber containing a ceramic-based slurry mixture to remove air bubbles from the ceramic-based slurry mixture;
while vacuuming the chamber, vacuuming a cavity of a component mold and introducing the ceramic-based slurry mixture into the cavity through a supply conduit fluidly coupling the chamber to an opening in a bottom portion of the cavity, such that the ceramic-based slurry mixture fills the cavity from the bottom portion to a top portion of the cavity;
continuing to vacuum the cavity including the ceramic-based slurry mixture for a predetermined time; and
forming a ceramic component within the cavity of the component mold over a duration of the predetermined time including curing the ceramic-based slurry mixture by chemically reacting a first material and a second material in the ceramic-based slurry mixture.

12. The method of claim 11, wherein:
a first material comprises an epoxy material;
a second material comprises an epoxy hardener; and at least one of the first material and the second material includes a plurality of zirconia particles.

13. The method of claim 12, wherein the zirconia particles are suspended within at least one of the first material and the second material and are distributed evenly throughout the respective first material and the second material.

14. The method of claim 12, wherein the introducing of the ceramic-based slurry mixture into the cavity of the component mold includes providing a combination of the first material and the second material into the cavity of the component mold.

15. The method of claim 11, wherein the cavity of the component mold is angularly oriented.

16. The method of claim 11, wherein the introducing of the ceramic-based slurry mixture into the cavity of the component mold includes forming a single air bubble only in a top portion of the cavity.

17. The method of claim 11, wherein the cavity of the component mold includes a coating.

* * * * *